(12) United States Patent
Gray et al.

(10) Patent No.: US 11,985,239 B2
(45) Date of Patent: *May 14, 2024

(54) FORWARD SECRECY IN TRANSPORT LAYER SECURITY (TLS) USING EPHEMERAL KEYS

(71) Applicant: International Business Machines Corporation, Armonk, NY (US)

(72) Inventors: Michael W. Gray, Guanaba (AU); Narayana Aditya Madineni, Southport (AU); Matthew Green, Canberra (AU); Simon D. McMahon, Gold Coast (AU); Leigh S. McLean, Nerang (AU); Stephen J. McKenzie, Mudgeeraba (AU); Luvita Burgess, Brisbane (AU); Peter T. Waltenberg, Gold Coast (AU)

(73) Assignee: International Business Machines Corporation, Armonk, NY (US)

( * ) Notice: Subject to any disclaimer, the term of this patent is extended or adjusted under 35 U.S.C. 154(b) by 10 days.

This patent is subject to a terminal disclaimer.

(21) Appl. No.: 17/503,049

(22) Filed: Oct. 15, 2021

(65) Prior Publication Data
US 2022/0038278 A1    Feb. 3, 2022

Related U.S. Application Data

(63) Continuation of application No. 16/679,422, filed on Nov. 11, 2019, now Pat. No. 11,206,135.

(51) Int. Cl.
*H04L 29/06* (2006.01)
*H04L 9/08* (2006.01)
(Continued)

(52) U.S. Cl.
CPC .......... *H04L 9/3073* (2013.01); *H04L 9/0891* (2013.01); *H04L 9/302* (2013.01); *H04L 9/3265* (2013.01); *H04L 63/166* (2013.01)

(58) Field of Classification Search
CPC ..... H04L 9/3073; H04L 9/0891; H04L 9/302; H04L 9/3265; H04L 63/166
See application file for complete search history.

(56) References Cited

U.S. PATENT DOCUMENTS 7,409,545 B2 * 8/2008 Perlman .................. H04L 9/088
                                                     380/278
8,837,741 B2    9/2014 Hawkes
(Continued)

FOREIGN PATENT DOCUMENTS

CN    101459506 A    6/2009
CN    102510387 A    6/2012
(Continued)

OTHER PUBLICATIONS

China Office action, 202080077907.1, dated Sep. 9, 2022.
(Continued)

*Primary Examiner* — Evans Desrosiers
(74) *Attorney, Agent, or Firm* — Edward J. Wixted, III

(57) ABSTRACT

Transport Layer Security (TLS) connection establishment between a client and a server for a new session is enabled using an ephemeral (temporary) key pair. In response to a request, the server generates a temporary certificate by signing an ephemeral public key using the server's private key. A certificate chain comprising at least the temporary certificate that includes the ephemeral public key, together with a server certificate, is output to the client by the server, which acts as a subordinate Certificate Authority. The client validates the certificates, generates a session key and outputs the session key wrapped by the ephemeral public key. To complete the connection establishment, the server applies the ephemeral private key to recover the session key derived at the client for the new session. The client and server (Continued)

thereafter use the session key to encrypt and decrypt data over the link. The ephemeral key pair is not reused.

18 Claims, 4 Drawing Sheets

(51) Int. Cl.
*H04L 9/30* (2006.01)
*H04L 9/32* (2006.01)
*H04L 9/40* (2022.01)

(56) References Cited

U.S. PATENT DOCUMENTS

| | | | |
|---|---|---|---|
| 9,166,782 B2 | 10/2015 | Boren | |
| 9,565,180 B2 | 2/2017 | Yerra | |
| 10,091,240 B2 | 10/2018 | Gero et al. | |
| 10,313,133 B2 | 6/2019 | Le Saint et al. | |
| 2015/0106624 A1 | 4/2015 | Gero et al. | |
| 2016/0234177 A1* | 8/2016 | Bone | G06F 13/4027 |
| 2019/0020632 A1* | 1/2019 | Leavy | H04L 9/14 |
| 2019/0245659 A1 | 8/2019 | Sun et al. | |
| 2019/0245695 A1* | 8/2019 | Le Saint | H04L 9/088 |
| 2019/0253261 A1 | 8/2019 | Gero et al. | |

FOREIGN PATENT DOCUMENTS

| | | |
|---|---|---|
| CN | 105993146 A | 10/2016 |
| JP | 2003124926 A | 4/2003 |
| JP | 2004530331 A | 9/2004 |
| JP | 2005142979 A | 6/2005 |

OTHER PUBLICATIONS

List of IBM Patents or Applications Treated as Related, May 3, 2022.
PCT/IB2020/060142, International Search Report and Written Opinion, dated Feb. 18, 2021.
Adrian, et al., "Imperfect Forward Secrecy: How Diffie—Hellman Fails in Practice", https://weakdh.org/weakdh-ccs-slides.pdf, weakdh.org, Accessed Dec. 6, 2023, pp. 1-34.
Author Unknown, "Can an Ephemeral Rsa Key Give Forward Secrecy?", https://crypto.stackexchange.com/questions/29744/can-an-ephemeral-rsa-key-give-forward-secrecy, Cryptography Stack Exchange, Accessed on Jun. 21, 2019, pp. 1-4.
Author Unknown, "Enabling Perfect Forward Secrecy", https://ssl.comodo.com/support/enabling-perfect-forward-secrecy.php, Knowledgebase: SSL, Accessed Jun. 20, 2019, pp. 1-6.
Wikipedia, "Server-Gated Cryptography", Wikipedia, the free encyclopedia, Accessed on Dec. 6, 2023, pp. 1-2, https://en.wikipedia.org/wiki/Server-Gated_Cryptography.

* cited by examiner

FORWARD SECRECY IN TRANSPORT LAYER SECURITY (TLS) USING EPHEMERAL KEYS

BACKGROUND OF THE INVENTION

Technical Field

This disclosure relates generally to information security on a computer network.

Background of the Related Art

Because network-based security threats are continually evolving, the use of Secure Sockets Layer (SSL) and/or Transport Layer Security (TLS)-based encryption for network communications has now become ubiquitous. Indeed, it is now estimated that upwards of two-thirds or more of all business network traffic is conveyed over SSL/TLS. In a typical scenario, client and server applications handshake with one another to establish a secure link. During this process, typically an RSA (Rivest-Shamir-Adelman) public key cryptographic protocol is used by the endpoints to share a secret (S) that, following the connection establishment, will be used by both sides to encrypt and decrypt data.

A well-known problem exists in the above-described scenario. In particular, because the server's RSA key pair is static in nature, any compromise of the server's static RSA private key potentially results in a loss of confidentiality for all session data. This is because each session's data is encrypted with the secret (S) that is exchanged under the server's static RSA key. An attack of this type is straightforward. To this end, an attacker simply records transmitted encrypted traffic between the client and server for all connections. Even though the secret used for each connection is different, all secrets are protected by the server's private key. Thus, when the attacker gains access to that key, e.g., through brute force or other attack vectors, the shared secrets (S) of all the recorded connections can be decrypted, and then all application data can be recovered and viewed. This situation is known as not having Perfect Forward Secrecy (PFS).

The technique of this disclosure addresses this problem.

BRIEF SUMMARY

This disclosure describes a method, apparatus and computer program product that prevents compromise of a set of derived session keys for a Transport Layer Security (TLS)-based link between a client and a server, thereby enabling perfect forward secrecy. The server has a public key pair comprising a server public key, and an associated server private key.

According to an aspect of this disclosure, the TLS connection establishment preferably operates as follows. In response to receipt at the server of a request to establish a new session, an ephemeral (temporary) key pair comprising an ephemeral public key, and an associated ephemeral private key, are retrieved, preferably from a pool of such key pairs generated in advance. The server generates a temporary certificate by signing the ephemeral public key using the server's own private key. The server then outputs to the client a certificate chain comprising at least the temporary certificate that includes the ephemeral public key, together with a server certificate that includes the server public key. In this manner, the server acts as a subordinate Certificate Authority. The client-side of the TLS connection then attempts to validate the certificates and, upon such validation, continues the TLS connection establishment by generating a session key (a shared secret (S)) and applying the ephemeral public key (received from the server in the temporary certificate). Thereafter, the server receives a message from the client, the message having been generated by the client applying the ephemeral public key to the session key derived at the client for the new session. The server then recovers the session key derived for the new session by applying the ephemeral private key to the message. This completes establishment of the new session, and the client and server applications thereafter use the session key (the shared secret) to encrypt and decrypt data over the TLS link. The ephemeral key pair is not reused. Using this approach, perfect forward secrecy is obtained, because compromise of a key associated with establishment of the new session does not compromise one or more other derived session keys of the set.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

Figure 1:
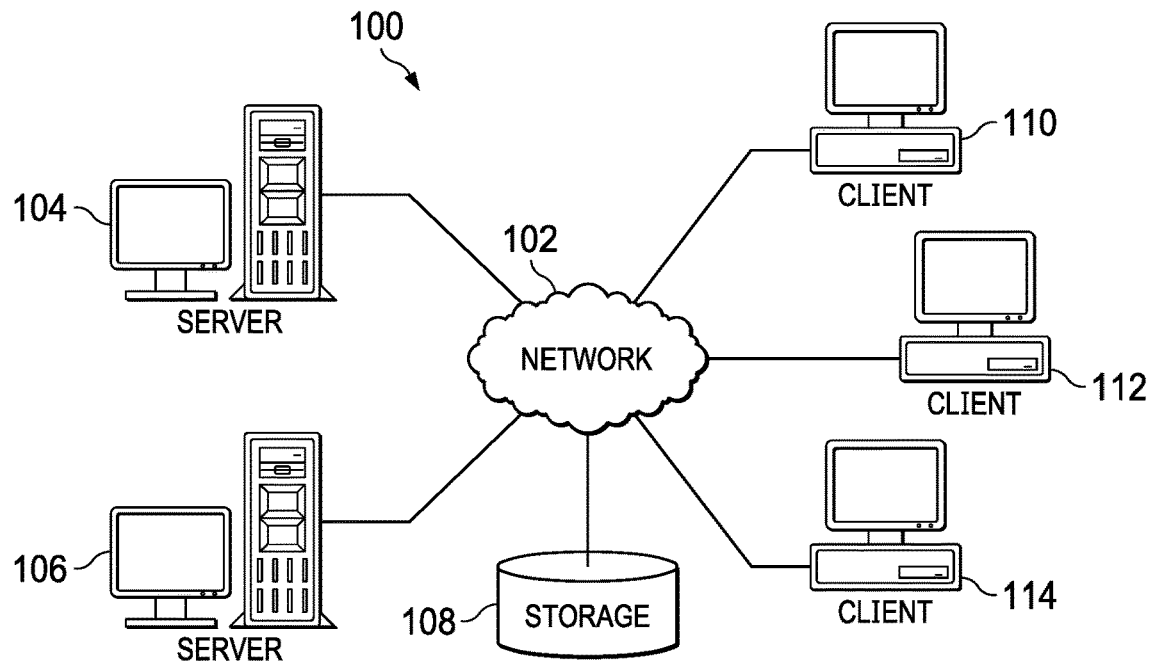
FIG. 1 depicts an exemplary block diagram of a distributed data processing environment in which exemplary aspects of the illustrative embodiments may be implemented.
Figure 2:
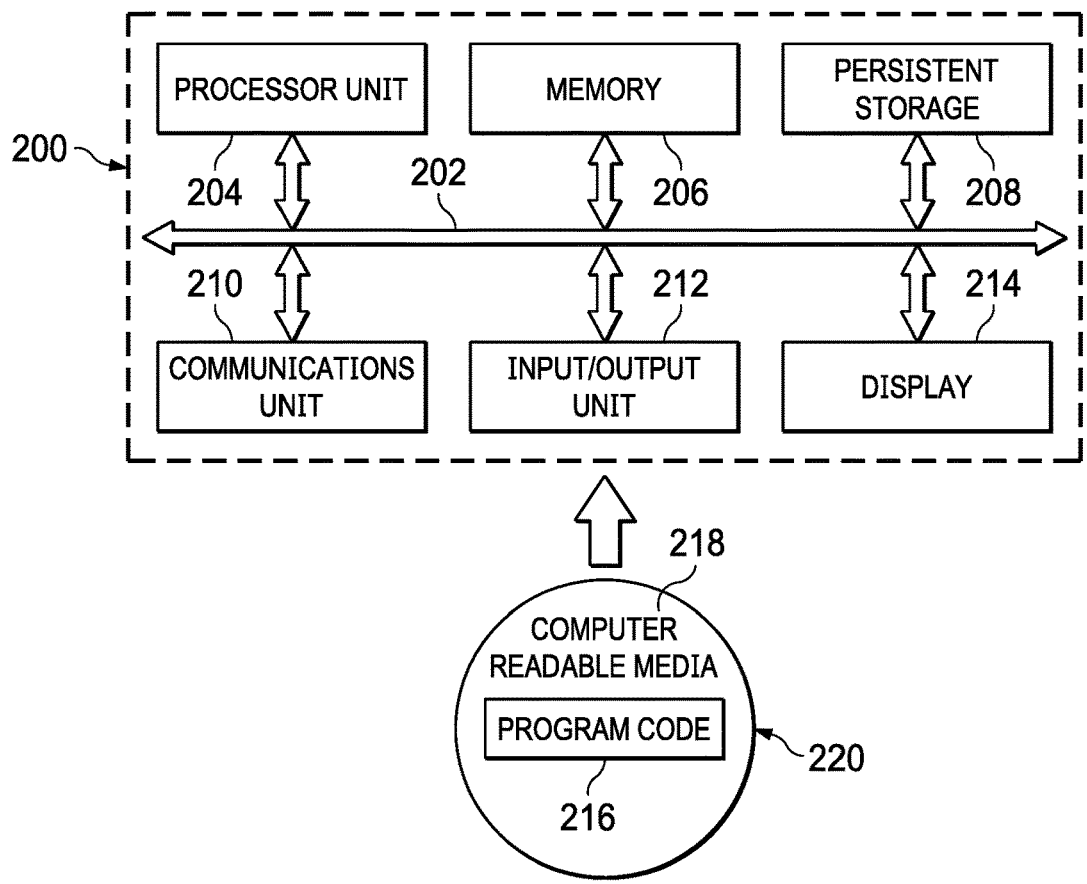
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

Client-Server Technologies

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Public Key Cryptosystems

Public-key cryptography (PKC) is a cryptographic approach that involves the use of asymmetric key algorithms. Unlike symmetric key algorithms, PKC does not require a secure initial exchange of one or more secret keys to both sender and receiver. The asymmetric key algorithms are used to create a mathematically-related key pair: a secret private key, and a published public key. Use of these keys allows protection of the authenticity of a message by creating a digital signature of a message using the private key, which can be verified using the public key. It also allows protection of the confidentiality and integrity of a message, by public key encryption, encrypting the message using the public key, which can only be decrypted using the private key.

Key generation is the process of generating keys for cryptography. Modern cryptographic systems include symmetric-key algorithms (e.g., DES, AES and others) and public-key algorithms (e.g., RSA, D-H, EDH, and others). Symmetric-key algorithms use a single shared key; data secrecy is maintained provided the single key is kept private. Public-key algorithms use key pairs consisting of a public key and a private key. The public key is made available to anyone, typically by means of a digital certificate. A sender encrypts data with the public key; only the holder of the private key can decrypt this data. Typically, computers use integers for keys. Keys may also be randomly generated using a random number generator (RNG) or pseudorandom number generator (PRNG). A PRNG is an algorithm that produces data that appears random under analysis. PRNGs that use system entropy to seed data generally produce better results, because this makes the initial conditions of the PRNG much more difficult for an attacker to guess. In other situations, the key is derived deterministically, e.g., using a key derivation function (KDF). A KDF typically uses a pseudo-random function to derive one or more secret keys from a secret value, such as a master key, a password or passphrase.

More generally, public key cryptography is useful for privacy (through encryption), and for authentication (using digital signatures). Encryption is the transformation of data into a form unreadable by anyone without a secret decryption key; encryption ensures privacy by keeping the content of the information hidden from anyone for whom it is not intended, even those who can see the encrypted data. Authentication is a process whereby the receiver of a digital message is assured of the identity of the sender and/or the integrity of the message. As an example (of both privacy and authentication), when a sender encrypts a message, the public key of the receiver is used to transform the data within the original message into the contents of the encrypted message. A sender uses a public key of the intended recipient to encrypt data, and the receiver uses its private key to decrypt the encrypted message. When authenticating data, data can be signed by computing a digital signature from the data using the private key of the signer. Once the data is digitally signed, it can be stored with the identity of the signer, and the signature then proves that the data originated from the signer. A signer uses its private key to sign data, and a receiver uses the public key of the signer to verify the signature.

Public key cryptosystems may be implemented in whole or in part with physical authenticators, which may be used to carry or protect a key. These physical authenticators include, for example, security tokens, hardware tokens, USB authenticators, key fobs, and the like, to carry a key. Such devices provide for cryptographic-based two-factor authentication (2FA). Two-factor authentication provides identification of users by means of the combination of two different components. These components may be something that the user knows, something that the user possesses or something that is inseparable from the user.

SSL/TLS

As further background, Secure Sockets Layer/Transport Layer Security (SSL/TLS) is a well-known cryptographic protocol that is used to secure communications over networks such as the Internet. Cryptographic protocols such as SSL/TLS are often based on public key cryptographic systems, such as the RSA (Rivest, Shamir and Adelman) encryption algorithm. For a traditional RSA-based SSL/TLS session, the two sides of a connection agree upon a "pre-master secret" (PMS) which is used to generate the parameters for the remainder of the session. Typically, the two sides use RSA asymmetric encryption to establish the pre-master secret without exchanging the actual value in plaintext. In operation, the SSL/TLS client generates the pre-master secret and encrypts it with the SSL/TLS server's publicly available RSA key. This generates an encrypted pre-master secret (ePMS), which is then provided to the SSL/TLS server. The SSL/TLS server has a private decryption key, which is then used to decrypt the encrypted pre-master secret. At this point, both the client and the server have the original pre-master secret and can use it to generate the symmetric key used for actual encrypted and secure data exchange.

Certificates, Trust Chains

A certificate is a digital document that vouches for the identity and ownership of a cryptographic key by a particular entity, such as an individual, a computer system, a specific server running on that system, or the like. Certificates are issued by certificate authorities. A certificate authority (CA) is an entity, usually a trusted third party to a transaction, which is trusted to sign or issue certificates for other people or entities. Typically, the CA assumes a legal responsibility for its vouching of the binding between a public key and its owner to allow one to trust the entity that signed a certificate. There are many commercial certificate authorities; these authorities are responsible for verifying the identity and key ownership of an entity when issuing the certificate. If a CA issues a certificate for an entity, the entity must provide a public key and some information about the entity. A software tool, e.g., a web browser, may digitally sign this information and send it to the certificate authority. The certificate authority might be a commercial company that provides trusted third-party certificate authority services. The CA creates a digital certificate by embedding (in the certificate) the requesting entity's public key, typically along with other identifying information, and then signing the digital certificate with the certificate authority's private key. Anyone who receives the digital certificate during a transaction or communication can then use the public key of the certificate authority to verify the signed public key within the certificate. The intention is that the certificate authority's signature acts as a tamper-proof seal on the digital certificate, thereby assuring the integrity of the data in the certificate.

Encrypted traffic on the web occurs by a chain of trust. Each web server has a certificate that it presents to each client (usually a web browser) to indicate that they are who they say they are. Web servers often get these certificates from an authority (the Certificate Authority, or CA) that can vouch for the legitimacy of the web server. The server's certificate indicates the authority from which the certificate was obtained (the "issuer"). Web browsers typically have a list of issuers that they trust. When a web browser is presented with a certificate from a web server, the browser will check the issuer and match it against its trusted list. If a match is found, the connection will continue; if a match is not found, the browser usually will present a warning and perhaps reject the connection. A CA is not necessarily a special entity other than the fact that it is trusted. Any entity can set itself up to trust, or sign, certificates. A certificate can trust itself, which is referred to as a self-signed certificate. To interoperate with a client using SSL/TLS, it is necessary to create certificates that the client will implicitly trust.

Figure 3:
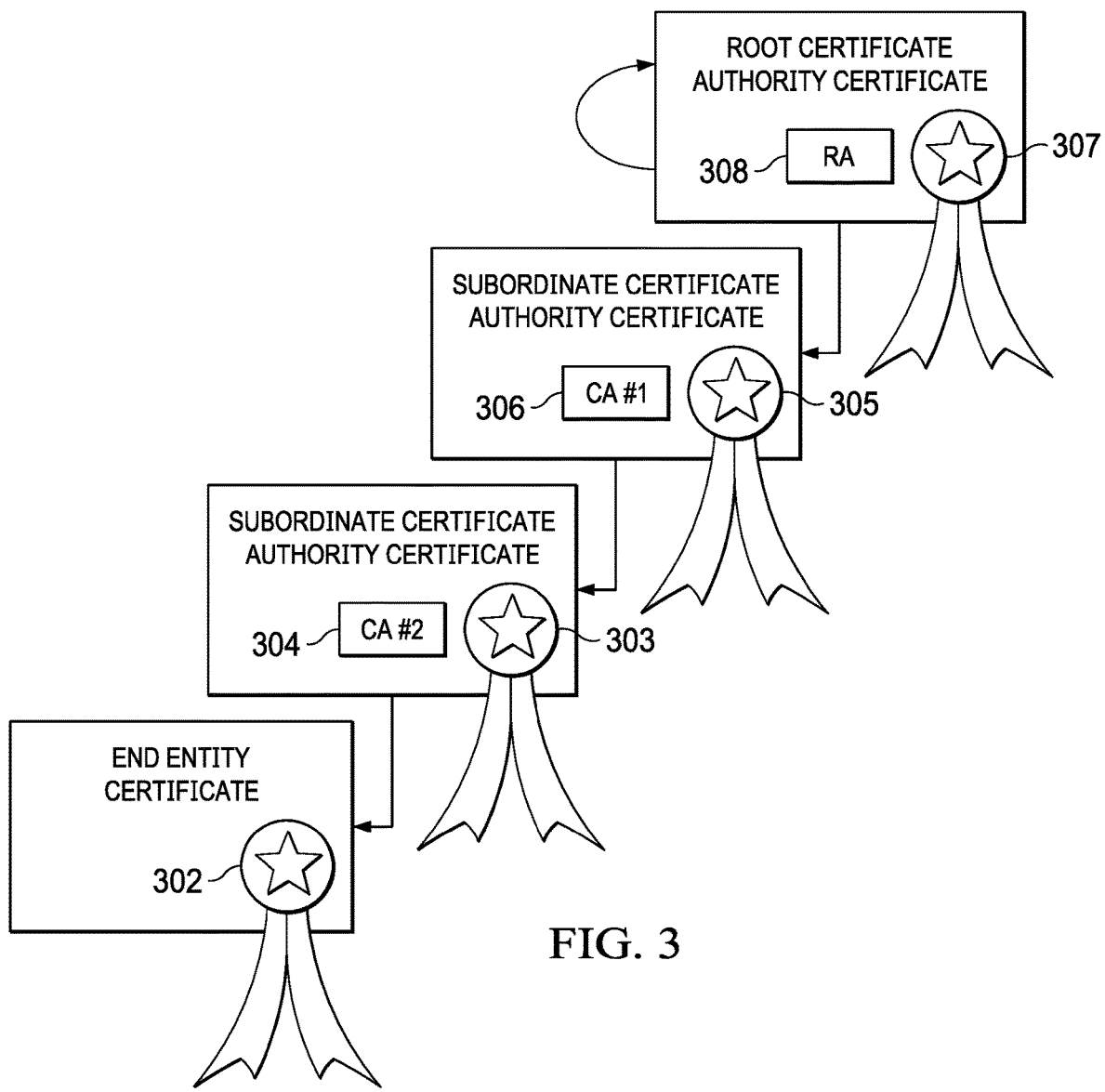
FIG. 3 illustrates a certificate hierarchy.

As noted above, certificate authorities digitally sign the certificates they issue using their own private key. Thus, another party can verify the information in a certificate, including its extensions, by validating the signature on the certificate with the certificate authority's own public key. The other party gets the certificate authority's public key from a certificate issued to the certificate authority and does a signature check that might involve the public key from yet another certificate. The chain of verification can be quite long, depending on the certificate hierarchy. FIG. 3 is an example of a simple certificate hierarchy using a public key protocol.

As depicted, the certificate hierarchy 300 contains several entities where an end-entity certificate 302 is issued by subordinate certificate authority (CA #2) 304. A certificate 303 of CA #2 304 is issued by a subordinate certificate authority (CA #1) 306. A certificate 305 of CA #1 306 is issued by a root certificate authority 308. The certificate 307 of the root certificate authority 308 is self-issued, meaning that its certificate is signed by its own private key (a self-signed certificate). The chain of signature verification begins with the end-entity certificate 302. In particular, the public key of CA #2 is used to verify the signature of the end-entity certificate 302. If that signature is valid, the public key of CA #1 306 is used to verify the signature of the CA #2 certificate 303. If that signature is valid, the public key of the root certificate is used to verify the signature of the CA #1 certificate 305. Finally, the signature of the root certificate 307 is verified using its own public key. Signature verification for the self-signed root certificate simply provides assurance that the root certificate is unaltered. It does not guarantee that the information in the certificate, or the certificate authority itself, is trustworthy because anyone can create a self-signed certificate and claim to be a certificate authority. Accordingly, trust in an entity's own selected set of certificate authorities and individual certificates must be established before using public key protocols. The selected set of trusted certificates or CAs are sometimes referred to as trusted roots, trusted signers, or, simply, a trust policy.

Servers may be configurable to implement and enforce trust policy. One example of a commercial server of this type is IBM® z/OS® Security Server. Security Server is an optional feature of z/OS that allows an administrator to control access to protected resources. IBM Security Server includes IBM RACF® (Resource Access Control Facility). For Java® users, RACF provides a set of Java Security Administration APIs to allow administration of users and groups in security repositories from z/OS RACF or other non-z/OS security mechanisms. RACF supports trust policies as described above through RACF key rings. Like other security software that supports digital certificates, RACF has a method for supplying a predefined set of trusted root certificates. To this end, RACF includes a base set of certificate authority certificates that are added to the RACF database whenever the system is initially loaded.

Generalizing, Certificate Authority (CA) hierarchies are reflected in certificate chains. A certificate chain traces a path of certificates, e.g., from a branch in the hierarchy to the root of the hierarchy. In a certificate chain, each certificate is followed by the certificate of its issuer, and each certificate contains the distinguished name (DN) of that certificate's issuer. This is the same as the subject name of the next certificate in the certificate chain. Each certificate is signed with the private key of its issuer. The signature can be verified with the public key in the issuer's certificate, which is the next certificate in the certificate chain.

Figure 4:
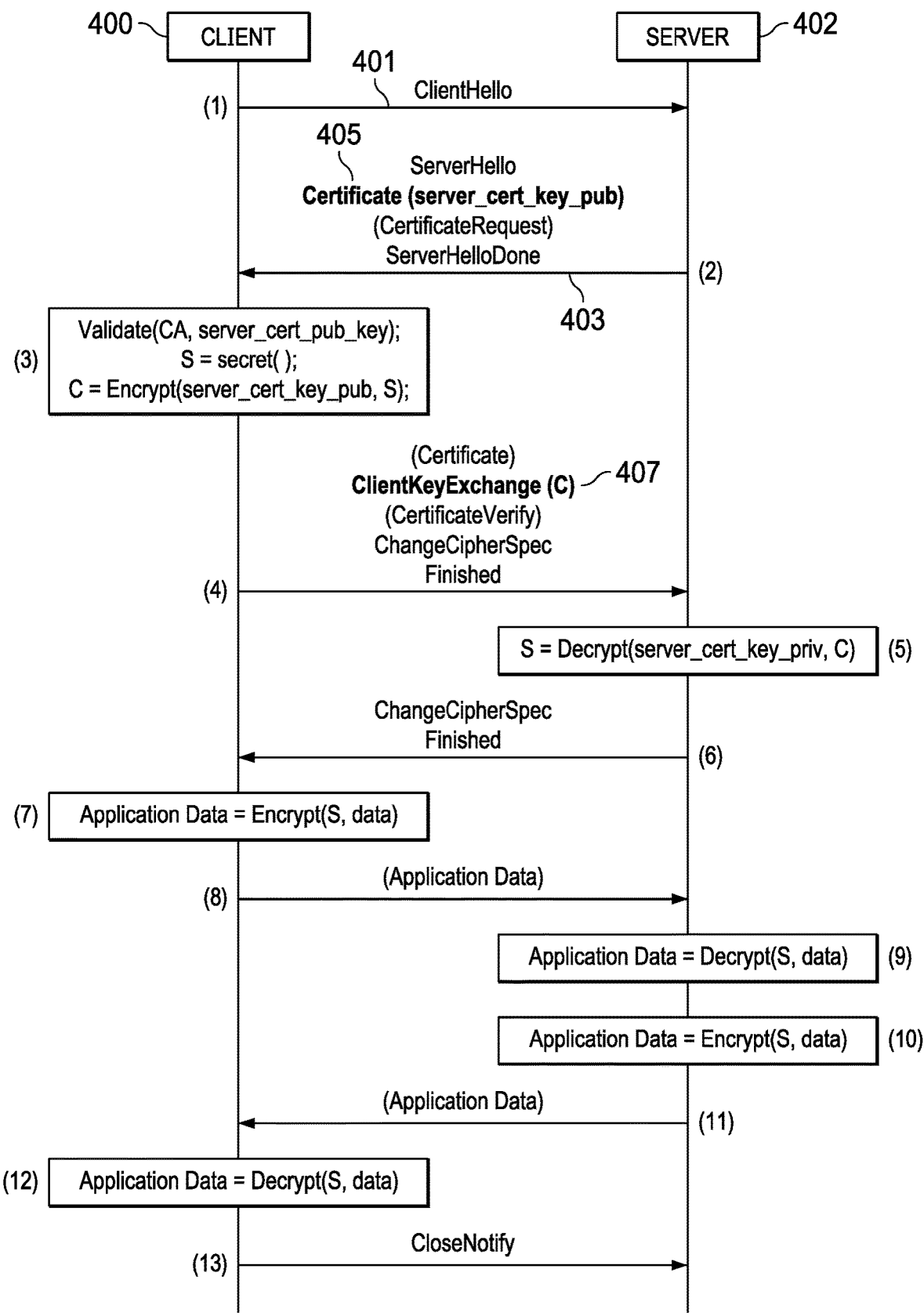
FIG. 4 depicts Transport Layer Security (TLS) connection establishment.

FIG. 4 depicts an SSL/TLS handshake between a client 400 and a server 402 without reference to the technique of this disclosure. It is assumed that the client 400 and server 402 use a secret (S) shared between them to encrypt and decrypt data. To share the secret, it is further assumed that an RSA (Rivest-Shamir-Adelman) public key cryptosystem is used. Familiarity with standards-based TLS 1.0, 1.1 and 1.2 is presumed in the following.

The handshake begins at step (1) with the server 402 receiving a valid TLS ClientHello message 401 from the client 400. At step (2), the server 402 responds with a ServerHello message 403 followed by the server's certificate 405 and any other certificates in the chain (as defined by TLS 1.0, 1.1 or 1.2). The certificate 405 includes the server's public key, namely, server-cert-key-pub. At step (3), the client validates the server's public key certificate. As depicted, the client 400 then generates a cryptographically-secure secret (S) and encrypts that secret with the server public key (server-cert-key-pub) that was provided in the server's public key certificate. At step (4), the client 400 sends the encrypted key (C) to the server 402 in a ClientKeyExchangeMessage (as defined by TLS 1.0, 1.1 or 1.2) 407. At step (5), the server 402 decrypts the secret (S) from encrypted key (C) using the server private key, namely server-cert-key-priv. At step (6), the server 402 responds to the client 400 that the handshake process is finished. All future encrypted messages in TLS (including application data) are then encrypted using the secret (S), which both sides of the communication now possess. For example, at step (7), the client 400 encrypts application data using the secret (S). That application data is then sent from the client 400 to the server 402, e.g., at step (8). On the server, and at step (9), the server recovers the application data by applying the secret (S) to the data received from the client. Likewise, application data sent by the server is first encrypted with the secret (S), e.g., at step (10), transmitted to the client, e.g., at step (11), decrypted at the client using the secret (S), e.g., at step (12), and so forth. When the client desires to close the connection, it notifies the server, e.g., at step (13), to complete the session.

A problem exists in the above-described scenario. In particular, the server's RSA key pair, namely, server-cert-key-priv and server-cert-key-pub, is static in nature, and thus a compromise of the server's static RSA private key potentially results in a loss of confidentiality for all session data. This is because each session's data is encrypted with the secret (S) that is exchanged under the server's static RSA key (server-cert-key-priv). An attack of this type is relatively straightforward. To this end, an attacker simply records transmitted encrypted traffic between the client 400 and the server 402 for all connections. Even though the secret used for each connection is different, all secrets are protected by the server's private key. Thus, when the attacker gains access to that key, e.g., through brute force or other attack vectors, the shared secrets (S) of all the recorded connections can be decrypted, and then all application data can be recovered and viewed. This situation is known as not having Perfect Forward Secrecy (PFS).

Using Ephemeral Keys Pairs in Ephemeral Transport Certificates for Forward Secrecy With the above as background, the technique of this disclosure is now described.

In particular, the technique in FIG. 4 is augmented by having the server and the client use ephemeral keys in lieu of the server's static RSA private key. As used herein, a cryptographic key is deemed to be "ephemeral" (and thus an "ephemeral key") because it is generated for each execution of a key establishment process, as will be seen. To achieve Perfect Forward Secrecy (PFS) according to the technique herein, the server uses ephemeral (preferably RSA) private and public keys in lieu of its static private key. The preferred technique is now described with reference to FIG. 5.

Figure 5:
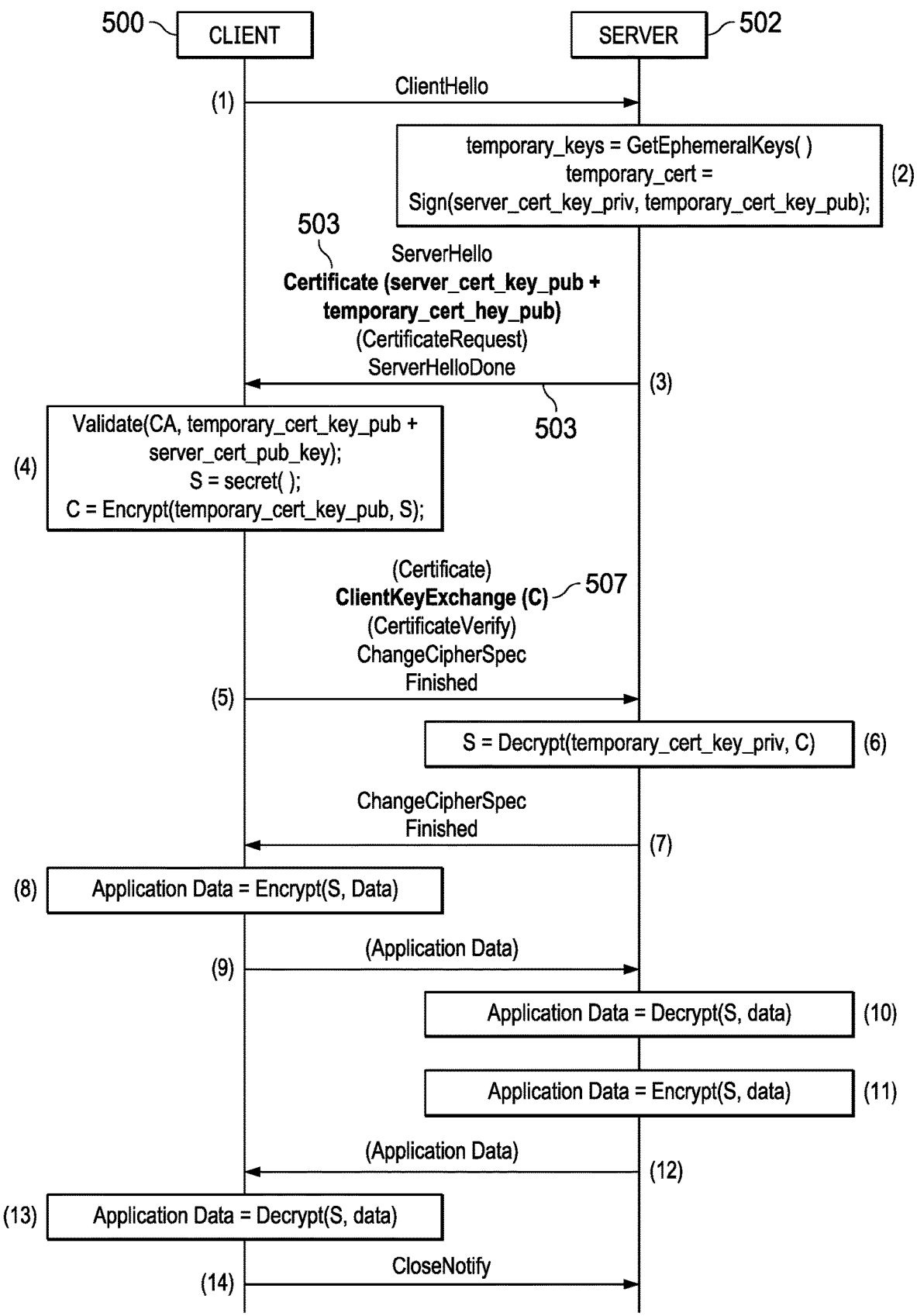
FIG. 5 depicts a technique of this disclosure to provide a perfect forward secrecy guarantee with respect to a set of session keys derived for the client and server.

In particular, FIG. 5 depicts an SSL/TLS handshake between a client 500 and a server 502 according to this disclosure. As with the prior embodiment, it is assumed that the client 500 and server 502 use a secret (S) shared between them to encrypt and decrypt data. To share the secret, it is further assumed that an RSA (Rivest-Shamir-Adelman) public key cryptosystem is used.

Once again, the handshake begins at step (1) with the server 502 receiving a valid TLS ClientHello message 501 from the client 500. In lieu of the server simply responding with its server certificate (and the server public key) as before, the following additional processing is carried out. In particular, at step (2), the server 502 obtains an RSA ephemeral public key pair (temporary-keys) and builds a temporary certificate (temporary-cert). The notion of "temporary" here refers to the life of a single session, compared with conventional use of RSA where keys usually have an expiry date set when issued (typically in the range of years) or are manually revoked because of a compromise. The ephemeral public key pair (comprising an ephemeral public key, and its associated private key) may be generated on-the-fly (i.e., at the time of the handshake), but a preferred approach is for the server to retrieve a key pair from a pool of pre-generated ephemeral key pairs. To be deemed ephemeral, the ephemeral keys (temporary-keys) are only used once per session. Preferably, the key pairs are generated in a random or pseudorandom manner such that the key value is not predictable of able to be derived from known data.

At step (2), and as depicted, the server 502 digitally signs (i.e., creates a digital signature) the ephemeral public key (temporary-key-pub) using the server's private key (server-cert-key-priv) to create the temporary certificate (temporary-cert). At step (3), the server responds to the ClientHello message 501 with a ServerHello message 503 that includes the temporary certificate (that includes the ephemeral public key), the server's certificate (that includes the server public key), and any other certificates in the chain (as defined by TLS 1.0, 1.1 or 1.2). These operations (the server obtaining the ephemeral key pair, and signing the ephemeral public key with the server private key to create the temporary certificate, and then including the temporary certificate in the server response) distinguishes this flow from that shown in FIG. 4. At step (4), the client 500 then performs a validation. This validation differs from that in the earlier flow in that, in addition to the client validating the server's public key certificate, the client 500 also attempts to validate the temporary certificate. If all certificates (in the chain) are validated, the client 500 then generates the cryptographically-secure secret (S) and, in this flow, encrypts that secret with the ephemeral public key (temporary-cert-key-pub) instead of using the server public key as in the prior flow. At step (5), the client 500 sends the encrypted key (C) to the server 502 in the ClientKeyExchangeMessage 507. At step (6), the server 502 decrypts the secret (S) from the encrypted key (C), in this flow using the temporary private key of the ephemeral public key pair, namely temporary-cert-key-priv instead of the server's private key (as in FIG. 4). At step (7), the server 502 responds to the client 500 that the handshake process is finished.

All future encrypted messages in TLS (including application data) are then encrypted using the secret (S), which both sides of the communication now possess. For example, at step (8), the client 500 encrypts application data using the secret (S). That application data is then sent from the client 500 to the server 502, e.g., at step (9). On the server, and at step (10), the server recovers the application data by applying the secret (S) to the data received from the client. Likewise, application data sent by the server is first encrypted with the secret (S), e.g., at step (11), transmitted to the client, e.g., at step (12), decrypted at the client using the secret (S), e.g., at step (13), and so forth. When the client desires to close the connection, it notifies the server, e.g., at step (14), to complete the session.

As a skilled person will appreciate, by using ephemeral keys during the handshake, several advantages are achieved. In particular, the server end entity certificate's static private key is used only to issue the temporary certificates, but that static private key is no longer used in the physical exchange of the secret over the wire. The above-described use of the server private key is tantamount to a digital signature operation, and not an encryption, and thus any exposure of the server private key in the future does not reveal the ephemeral key in use itself, thereby ensuring perfect forward secrecy. Thus, if an attacker gains access to the server's private key, the messages are still secure because the ephemeral private key is unknown, and there is no way for the attacker to obtain the secret session key (S). Stated another way, the ephemeral key pairs preferably are randomly-generated and by definition short-lived, thereby facilitating forward secrecy even when the server private key is exposed. The server entity's certificate is used only to sign the short-lived key to create the temporary certificate, and to enable the client (using that server entity certificate) to validate the ephemeral transport certificate. The approach has a further advantage of avoiding renegotiation when necessary to downgrade the connection between the client and the server.

In the approach herein, the server end-entity certificate is used as a subordinate Certificate Authority. As noted, the server creates the temporary certificate using the ephemeral key pair for the session, signs and sends that temporary certificate as part of the certificate chain that includes the server certificate, which in turn is then used at the client to validate the transport certificate. When the validations succeed, the client uses the ephemeral public key it has received in the transport certificate to encrypt the client-generated shared secret (S) that is required at the server to complete the handshake. The secret (S) then acts as the symmetric session key to encrypt and decrypt data for the established connection. Using ephemeral keys for exchanging the session key provides perfect forward secrecy. Indeed, no compromise of the server private key has the effect of compromising many TLS session keys. An ephemeral RSA private key compromise only compromises the session that it is used to establish, and compromise of the static RSA server private key only allows invalid signatures to be created but does not compromise previous TLS sessions.

While the approach is described using RSA as the preferred public key cryptographic scheme, this is not a requirement, as other asymmetric cryptographic algorithms supporting digital signature operations may be substituted for the static key pair, and other asymmetric cryptographic algorithms supporting encryption/decryption may be substituted for the ephemeral key pairs. Generalizing, the technique herein may be used with any protocol that uses Public Key Infrastructure (PKI) and, in particular, where a static digital signature key pair (a) signs an ephemeral asymmetric encrypting key pair (e) that is used to exchange a shared secret key(s).

While a preferred operating environment and use case has been described, the techniques herein may be used in any other operating environment in which it is desired to protect network traffic to and/or from a computing system or device.

As has been described, the functionality described above may be implemented as a standalone approach, e.g., a software-based function executed by a processor, or it may be available as a service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The techniques described herein may be implemented in or in conjunction with various client-side architectures (e.g., firewalls, NAT devices), and in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible, non-transitory item.

The computer program product may be a product having program instructions (or program code) to implement one or more of the described functions. Those instructions or code may be stored in a non-transitory computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the interfaces and utility are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein generally provide for the above-described improvements to a technology or technical field, as well as the specific technological improvements to cryptographically-secure network communications, such as described above.

Having described the subject matter, what we claim is as follows:

1. A method of preventing compromise of a set of derived session keys for a Transport Layer Security (TLS)-based link between a client and a server, the server having a public key pair comprising a server public key, and an associated server private key, comprising:
   at the client:
      issuing to the server a request to establish a new session;
      receiving from the server a certificate chain, the certificate chain comprising a server certificate comprising the server public key, together with a temporary certificate that includes an ephemeral public key of a server ephemeral key pair, the server ephemeral key pair having an associated ephemeral private key, the temporary certificate having been generated by the server signing the ephemeral public key with the server private key;
      validating at least the temporary certificate;
      responsive to validating the temporary certificate, deriving a session key for the new session;
      applying the ephemeral public key of the server to the derived session key to generate a message; and
      outputting the message to the server, the derived session key being recoverable by the server applying the ephemeral private key of the server to the message to complete establishment of the new session;
   wherein compromise of a key associated with establishment of the new session does not compromise one or more other derived session keys of the set.

2. The method as described in claim 1 wherein the public key pair and the ephemeral key pair are Rivest-Shamir-Adelman (RSA) key pairs.

3. The method as described in claim 1 wherein the ephemeral public key of the server is applied to the derived session key in lieu of the server public key.

4. The method as described in claim 1 further including validating the server certificate.

5. The method as described in claim 1 wherein, following establishment of the new session, applying the derived session key to application data.

6. The method as described in claim 1 wherein the ephemeral public key is not re-used following closing of the new session.

7. An apparatus configured as a client, comprising:
   a processor;
   computer memory holding computer program instructions executed by the processor, the computer program instructions comprising program code configured to prevent compromise of a set of derived session keys for a Transport Layer Security (TLS)-based link between the client and a server, the server having a public key pair comprising a server public key, and an associated server private key, the program code configured to:
      issue to the server a request to establish a new session;
      receive from the server a certificate chain, the certificate chain comprising a server certificate comprising the server public key, together with a temporary certificate that includes an ephemeral public key of a server ephemeral key pair, the server ephemeral key pair having an associated ephemeral private key, the temporary certificate having been generated by the server signing the ephemeral public key with the server private key;
      validate at least the temporary certificate;
      responsive to validating the temporary certificate, derive a session key for the new session;
      apply the ephemeral public key of the server to the derived session key to generate a message; and
      output the message to the server, the derived session key being recoverable by the server applying the ephemeral private key of the server to the message to complete establishment of the new session;
   wherein compromise of a key associated with establishment of the new session does not compromise one or more other derived session keys of the set.

8. The apparatus as described in claim 7 wherein the public key pair and the ephemeral key pair are Rivest-Shamir-Adelman (RSA) key pairs.

9. The apparatus as described in claim 7 wherein the ephemeral public key of the server is applied to the derived session key in lieu of the server public key.

10. The apparatus as described in claim 7 wherein the program code is also configured to validate the server certificate.

11. The apparatus as described in claim 7 wherein the program code is further configured following establishment of the new session to apply the derived session key to application data.

12. The apparatus as described in claim 7 wherein the ephemeral public key is not re-used following closing of the new session.

13. A computer program product in a non-transitory computer readable medium for use in a data processing system, the computer program product holding computer program instructions executed by the data processing system to prevent compromise of a set of derived session keys for a Transport Layer Security (TLS)-based link between a client and a server, the server having a public key pair comprising a server public key, and an associated server private key, the computer program instructions comprising program code configured at the client to:

issue to the server a request to establish a new session;

receive from the server a certificate chain, the certificate chain comprising a server certificate comprising the server public key, together with a temporary certificate that includes an ephemeral public key of a server ephemeral key pair, the server ephemeral key pair having an associated ephemeral private key, the temporary certificate having been generated by the server signing the ephemeral public key with the server private key;

validate at least the temporary certificate;

responsive to validating the temporary certificate, derive a session key for the new session;

apply the ephemeral public key of the server to the derived session key to generate a message; and output the message to the server, the derived session key being recoverable by the server applying the ephemeral private key of the server to the message to complete establishment of the new session;

wherein compromise of a key associated with establishment of the new session does not compromise one or more other derived session keys of the set.

14. The computer program product as described in claim 13 wherein the public key pair and the ephemeral key pair are Rivest-Shamir-Adelman (RSA) key pairs.

15. The computer program product as described in claim 13 wherein the ephemeral public key of the server is applied to the derived session key in lieu of the server public key.

16. The computer program product as described in claim 13 wherein the program code is also configured to validate the server certificate.

17. The computer program product as described in claim 13 wherein the program code is further configured following establishment of the new session to apply the derived session key to application data.

18. The computer program product as described in claim 13 wherein the ephemeral public key is not re-used following closing of the new session.

* * * * *